US007918999B2

(12) United States Patent
Gagnon et al.

(10) Patent No.: US 7,918,999 B2
(45) Date of Patent: Apr. 5, 2011

(54) FILTRATION ASSEMBLIES, FILTRATION MANIFOLDS, FILTRATION UNITS, AND METHODS OF CHANNELING PERMEATE

(75) Inventors: Roger Gagnon, Great River, NY (US); Thomas Scholz, Mt. Sinai, NY (US); Martin Weinstein, South Dartmouth, MA (US); Sylvia Messier, Stow, MA (US); Steven Pearl, Hollis, NH (US)

(73) Assignee: Pall Corporation, Port Washington, NY (US)

( * ) Notice: Subject to any disclaimer, the term of this patent is extended or adjusted under 35 U.S.C. 154(b) by 416 days.

(21) Appl. No.: 11/953,254

(22) Filed: Dec. 10, 2007

(65) Prior Publication Data

US 2008/0135500 A1 Jun. 12, 2008

Related U.S. Application Data

(60) Provisional application No. 60/874,012, filed on Dec. 11, 2006.

(51) Int. Cl.
*B01D 63/08* (2006.01)
*B01D 61/00* (2006.01)

(52) U.S. Cl. .............. 210/321.72; 210/346; 210/321.75; 210/486

(58) Field of Classification Search .................. None
See application file for complete search history.

(56) References Cited

U.S. PATENT DOCUMENTS

| 3,525,200 A | 8/1970 | Smith |
|---|---|---|
| 3,556,300 A | 1/1971 | Coda |
| 3,754,657 A | 8/1973 | Harp |
| 3,878,102 A | 4/1975 | Busse et al. |
| 4,046,685 A * | 9/1977 | Bray ............................ 210/652 |
| 4,472,183 A | 9/1984 | Mace |
| 4,715,955 A | 12/1987 | Friedman |
| 4,849,102 A | 7/1989 | Latour et al. |
| 5,084,220 A | 1/1992 | Moller |
| 5,147,542 A | 9/1992 | Proulx |
| 5,192,434 A | 3/1993 | Moller |
| 5,417,511 A | 5/1995 | Warden |
| 5,599,447 A | 2/1997 | Pearl et al. |
| 5,868,930 A | 2/1999 | Kopf |
| 6,337,013 B1 | 1/2002 | Koopmans et al. |
| 6,506,300 B2 | 1/2003 | Kuss et al. |
| 6,773,002 B2 | 8/2004 | Adoline et al. |
| 6,929,743 B2 | 8/2005 | Diel |
| 2002/0108900 A1 * | 8/2002 | Hirose et al. ............. 210/321.74 |
| 2002/0170854 A1 | 11/2002 | Kuss et al. |
| 2005/0029183 A1 | 2/2005 | Sternad et al. |
| 2006/0147294 A1 | 7/2006 | Rode |
| 2006/0163141 A1 | 7/2006 | Weinstein et al. |
| 2007/0023348 A1 | 2/2007 | Harms et al. |

FOREIGN PATENT DOCUMENTS

| DE | 86 11 377 U1 | 4/1987 |
|---|---|---|
| EP | 0 106 933 A1 | 5/1984 |
| EP | 0 535 546 A1 | 4/1993 |
| GB | 2 343 853 A | 5/2000 |
| GB | 2 348 381 A | 10/2000 |
| WO | WO 03/055579 A2 | 7/2003 |

* cited by examiner

*Primary Examiner* — Krishnan S Menon
(74) *Attorney, Agent, or Firm* — Leydig, Voit & Mayer, Ltd.

(57) ABSTRACT

This invention relates to filtration manifolds, filtration assemblies, methods of channeling permeate, and filtration units. Filtration assemblies may include filtration units and filtration manifolds having isolated permeate collection passages. Permeate may be channeled through the isolated permeate collection passages of the filtration manifold during filtration and then output from the manifold.

9 Claims, 5 Drawing Sheets

US 7,918,999 B2

FILTRATION ASSEMBLIES, FILTRATION MANIFOLDS, FILTRATION UNITS, AND METHODS OF CHANNELING PERMEATE

FIELD OF INVENTION

The invention relates to filtration assemblies, manifolds, filtration units, and methods of channeling permeate for any and all types of separation processes. More particularly, it relates to filtration assemblies which include manifolds having isolated permeate collection passages and methods of channeling permeate through the isolated permeate collection passages.

Filtration assemblies embodying the invention may be arranged for tangential flow filtration or for direct flow or dead-end flow filtration. For direct flow or dead-end flow filtration, process or feed fluid is directed to a permeable filtration medium. All of the feed fluid then passes through the filtration medium as filtrate or permeate, except any substances in the fluid that are retained by the filtration medium. For tangential flow filtration, feed fluid is directed tangentially along a permeable filtration medium. A portion of the feed fluid passes through the filtration medium as permeate, and the remaining portion of the feed fluid, the concentrate or retentate, is directed away from the filtration medium.

Filtration assemblies embodying the invention may include two or more filtration units aligned and compressed between opposite end pieces. One or more manifolds may be arranged with the filtration units to feed fluid to the filtration units and/or to collect fluid from the filtration units. A manifold may function as an end piece or may be aligned and compressed with the filtration units between the opposite end pieces.

Each filtration unit may include a casing, for example, as a frame, associated with at least one permeable filtration medium. The filtration medium has a feed side and a permeate side. The casing has feed passages which direct feed fluid to be filtered to the feed side of the filtration medium and permeate passages which collect fluid or permeate which has passed through the filtration medium to the permeate side. In filtration assemblies which are arranged for tangential flow filtration, the casing may also have retentate passages which collect the retentate that has not passed through the filtration medium.

Each manifold may have an inlet and/or an outlet and one or more fluid passages fluidly communicating with the inlet or the outlet. For example, a manifold may include only one type of passage, i.e., only feed passages or only permeate passages or only retentate passages. Alternatively, a manifold may include any two or all three types of passages, e.g., feed and permeate passages but no retentate passages.

The manifold, or manifolds, and the filtration units may be arranged for filtration within the filtration assembly with the appropriate fluid passages communicating with one another. For example, in filtration assemblies which are arranged for tangential flow filtration, a manifold and the filtration units may be aligned with their feed passages fluidly communicating, their retentate passages fluid communicating, and their permeate passages fluidly communicating. Feed fluid may be directed via the feed passages from a manifold to the filtration units, where the feed fluid may be passed tangentially along the feed side of each filtration medium. A portion of the feed fluid may pass as permeate through the permeable filtration medium to the permeate side of the filtration medium. The permeate may then be directed via the permeate passages from the permeate side of each filtration medium to a manifold. The retentate may be directed via the retentate passages from the feed side of each filtration medium to a manifold.

SUMMARY OF THE INVENTION

In accordance with one aspect of the invention, filtration manifolds may comprise a body, a first permeate collection passage in the body, and a second permeate collection passage in the body. The body may have a first side and a second side. The first permeate collection passage may include a first permeate inlet on a first side of the body and a first permeate outlet, and the first permeate collection passage may be isolated from the second side of the body. The second permeate collection passage may include a second permeate inlet on the second side of the body and a second permeate outlet, and the second permeate collection passage may be isolated from the first side of the body. Further, the first and second permeate collection passages may be isolated from one another within the body.

In accordance with another aspect of the invention, filtration assemblies may comprise at least two filter sets and a manifold. Each filter set may include at least one filtration unit having a filtration medium. The filtration medium may have a feed side and a permeate side. The manifold may include first and second permeate collection passages isolated from one another within the manifold. The first permeate collection passage may be in fluid communication with the permeate side of the filtration medium of each filtration unit of the first filter set and fluidly isolated from the permeate side of the filtration medium of each filtration unit of the second filter set. The second permeate collection passage may be in fluid communication with the permeate side of the filtration medium of each filtration unit of the second filter set and fluidly isolated form the permeate side of the filtration medium of each filtration unit of the first filter set.

In accordance with another aspect of the invention, methods of channeling permeate may comprise directing a first permeate from the filtration medium of a first set of one or more filtration units to only a first permeate collection passage in a permeate manifold and directing a second permeate from the filtration medium of a second set of one or more filtration units to only a second permeate collection passage in the permeate manifold. The method may further comprise isolating the first permeate from the second permeate in the manifold, outputting the first permeate from the manifold, and outputting the second permeate from the manifold.

In accordance with another aspect of the invention, filtration units may comprise a filtration medium including a feed side and a permeate side and a casing cooperatively arranged with the filtration medium to isolate the feed side from the permeate side. The casing may include a feed passage fluidly communicating with the feed side of the filtration medium, a first permeate passage fluidly communicating with a permeate side of the filtration medium, and a second permeate passage fluidly isolated from the permeate side of the filtration medium and the first permeate passage.

Filtration assemblies, manifolds, filtration units and methods of channeling permeate embodying the invention have many advantages. For example, isolated permeate collection passages and isolated permeate collection networks may prevent different permeates from different sources, e.g., different filtration units, from mixing. This simplifies the identification of a failed filtration unit and decreases the time required to identify a failed filtration unit, which decreases overall maintenance time. Moreover, isolation of permeates from different sources may prevent contamination of one permeate when a separate permeate is contaminated due to any upstream breach of integrity, including, e.g., filtration unit failure. Additionally, filtration may continue with respect to one permeate collection passage while filtration with respect to the other permeate collection passage is interrupted for any reason including, e.g., cleaning, maintenance, location of a failed filtration unit, etc. Another advantage includes the possibility of conducting two different separations simultaneously by including one type of filtration unit in the first filter set and another type of filtration unit in the second filter set. For example, the first filter set may include filtration units having different treatment characteristics, such as a different removal rating or a different chemical or physical composition or a different surface chemistry, than the filtration units of the second filter set. An additional advantage includes the ability to compare different types of filtration units in each filter set. Moreover, filtration manifolds, filtration assemblies, methods of channeling permeate, and filtration units according to the invention provide highly efficient and cost-effective filtration of fluids.

DESCRIPTION OF PREFERRED EMBODIMENTS

Many different filtration assemblies may embody one or more aspects of the invention. Filtration assemblies according to the invention may include at least one manifold and at least two filter sets, each filter set including at least one filtration unit. The manifold may include first and second permeate collection passages isolated from one another. The first permeate collection passage may be in fluid communication with the permeate from the filtration units of the first filter set. Further, the first permeate collection passage may be fluidly isolated from the permeate form the filtration units of the second filter set, i.e., the first permeate collection passage may not fluidly communicate with any of the permeate which passes through the filtration medium of a filtration unit of the second filter set. Similarly, the second permeate collection passage may be in fluid communication with the permeate from the filtration units of the second filter set. Further, the second permeate collection passage may be fluidly isolated from the filtration units of the first filter set, i.e., the second permeate collection passage may not fluidly communicate with any of the permeate which passes through the filtration medium of a filtration unit of the first filter set. For example, the first permeation collection passage in the manifold may fluidly communicate only with the permeate which passes through the filtration medium of the filtration units of the first set, and the second permeate collection passage in the manifold may fluidly communicate only with the permeate which passes through the filtration medium of the filtration units of the second set.

Figure 1:
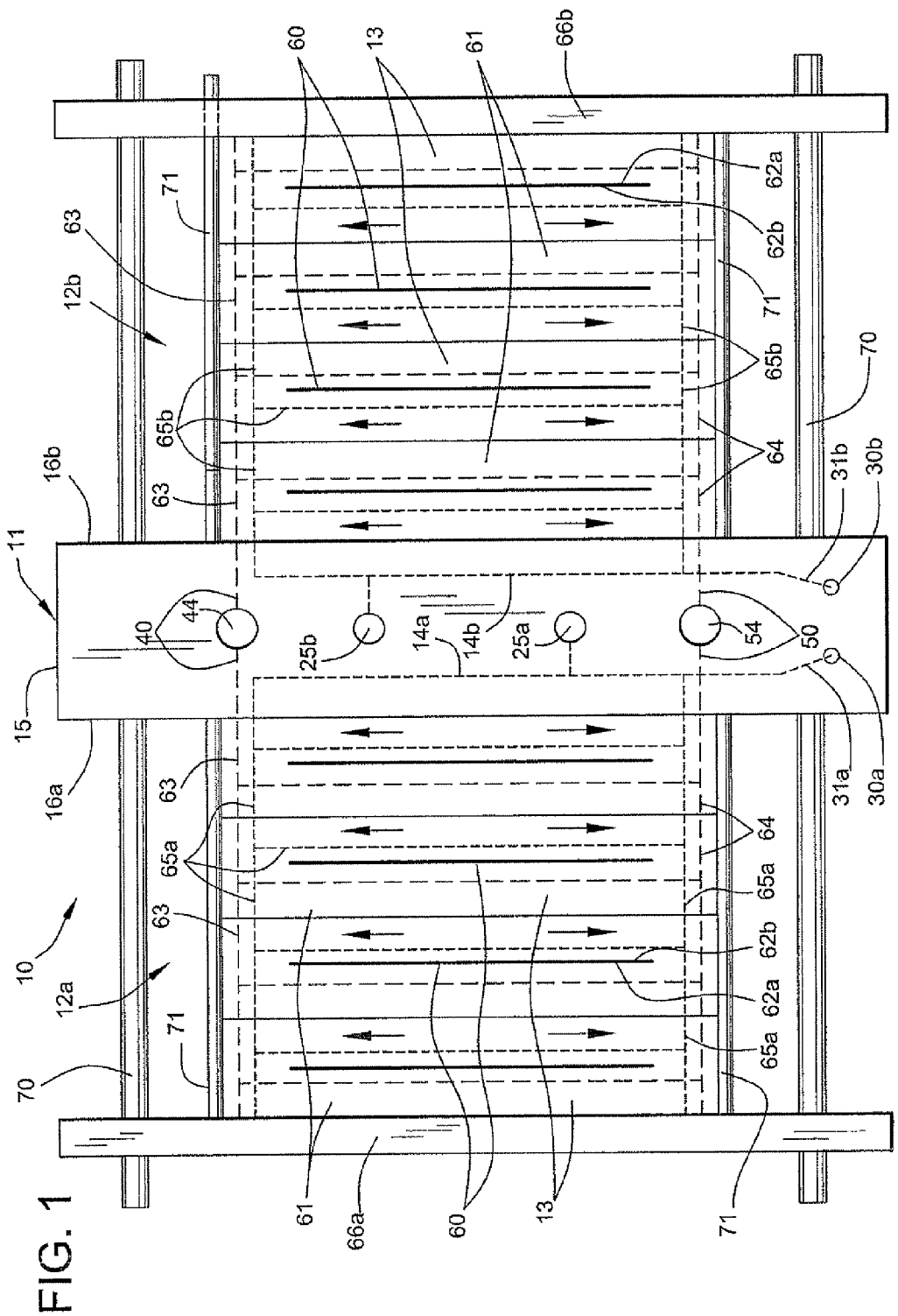
FIG. 1 is a representative view of one embodiment of a filtration assembly.

One example of a filtration assembly is a tangential flow filtration assembly, for example, as shown in FIG. 1. The filtration assembly 10 may include a manifold 11 positioned between first and second filter sets 12a, 12b, each including at least one filtration unit 13. The manifold 11 may include first and second permeate collection passages 14a, 14b that may be isolated from one another. The first and second permeate collection passages 14a, 14b of manifold 11 may be in fluid communication with the permeate from the first and second filter sets 12a, 12b, respectively, and may be fluidly isolated from the permeate from the second and first filter sets 12b, 12a, respectively.

The manifold may be configured in any of a variety of different ways. For example, as shown in FIGS. 1-4, the manifold 11 may comprise a body 15 having first and second opposite sides 16a, 16b. The body of the manifold may comprise any suitable material, including, for example, metal, such as stainless steel, or plastic, and may have any suitable configuration, such as, for example, a generally hexagonal configuration. Different separation processes may require different types and/or sizes of filtration units, and the shape and size of the manifold may be varied accordingly.

The body of the manifold may include any of a variety of coupling elements that may connect the manifold within a tangential flow filtration assembly in any of a variety of different ways. Coupling elements may include holes, sockets, fittings, bolts, rivets, screws, or any other structure that may securely attach the manifold within the filtration assembly. For example, the body 15 may include two through holes 20 that may pass through the body 15 and may be used to connect the manifold 11 within the filtration assembly 10 via, e.g., compression rods 70, as shown in FIG. 1. Alternatively or additionally, as shown in FIGS. 1-4, the body 15 may include multiple sockets 21 that may connect to alignment rods 71 which align the filtration units 13 within the filtration assembly 10.

The body of the manifold may include first and second permeate collection passages that may be configured in any of a variety of different ways. For example, in some embodiments the manifold may include permeate inlets on at least two sides of the body and permeate flow into the manifold may be bidirectional, i.e., fluid may flow into, or from, the manifold in at least two different, e.g., opposite, directions. In other embodiments, the manifold may include permeate inlets on only one side of the body and permeate flow into the manifold may be unidirectional, i.e., fluid may flow into, or from, the manifold in only one direction.

Figure 3:
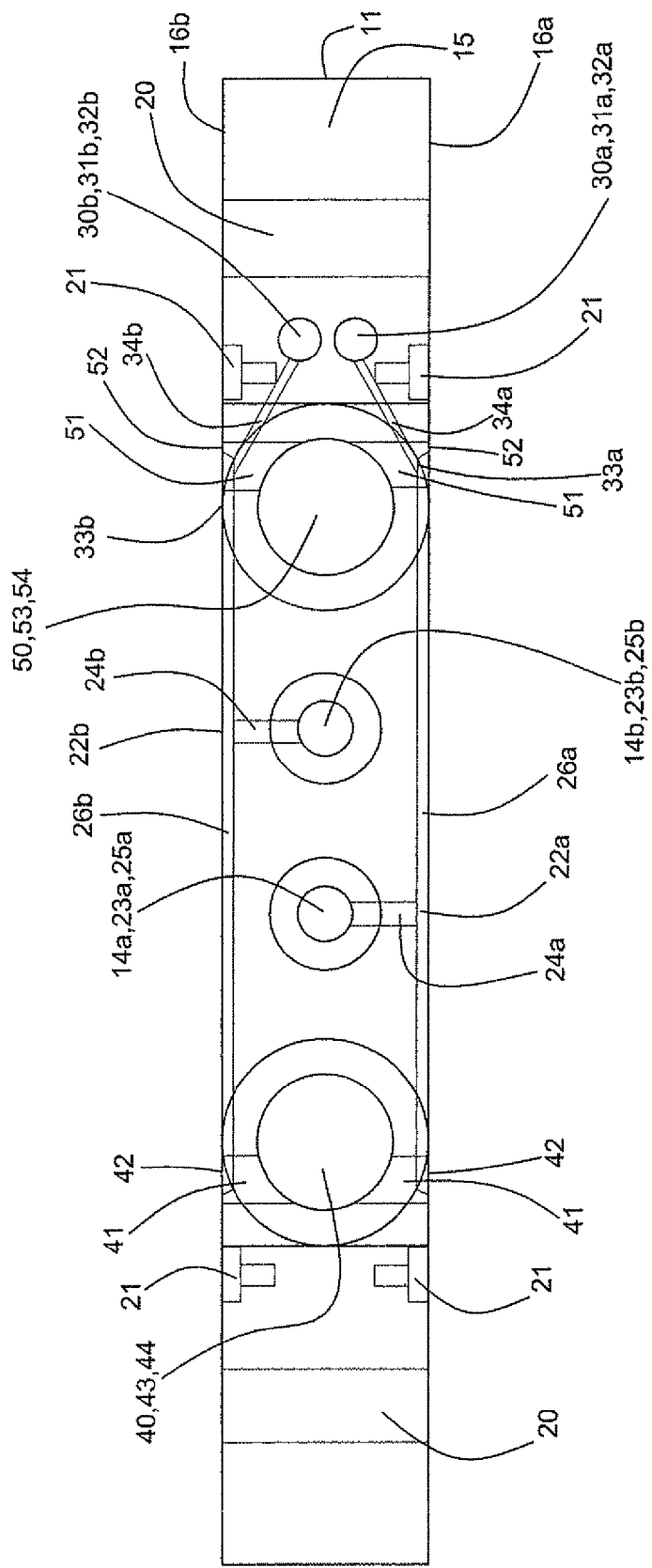
FIG. 3 is a transparent view through the top of the filtration manifold showing various fluid passageways.
Figure 4:
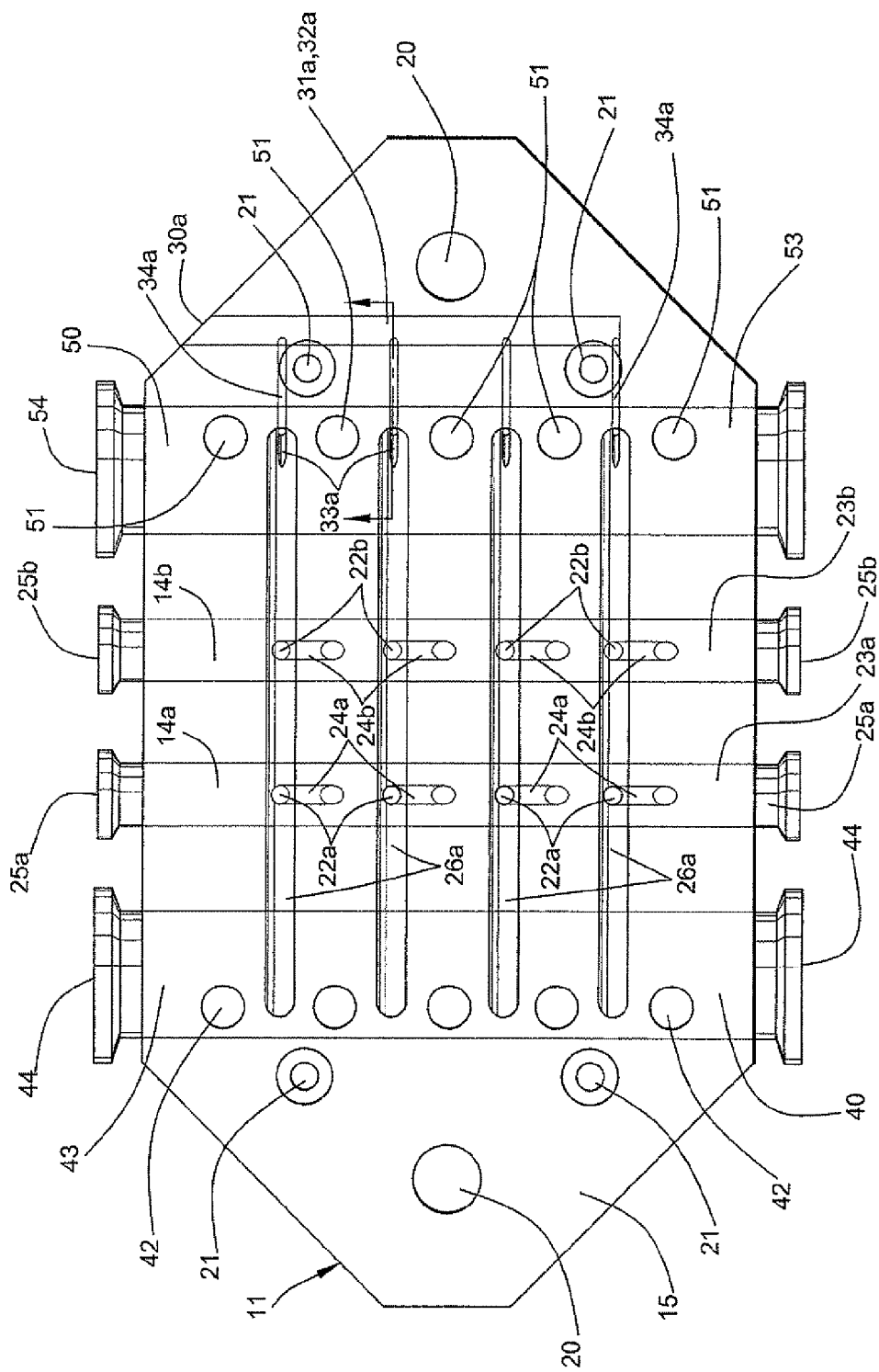
FIG. 4 is a transparent view through the side of the filtration manifold showing various fluid passageways.

In many embodiments, the manifold 11 may include first and second permeate collection passages 14a, 14b that are isolated from one another, as shown in FIG. 3 and 4. The first and second permeate collection passages 14a, 14b may collect permeate from different, isolated sources. For example, as shown in FIG. 1, the first and second permeate collection passages 14a, 14b may collect permeate from first and second sets 12a, 12b of filtration units 13, respectively, and may be isolated from the permeate which passes through the filtration media of the second and first sets 12b, 12a of filtration units 13, respectively. The first and second permeate passages 14a, 14b are isolated from each other and are not in fluid communication at any point inside the manifold. Isolation of the first permeate from the second permeate inside the manifold or inside the filtration assembly may not exclude the combination of the first and second permeates on the exterior of the manifold or the exterior of the filtration assembly, for example, following filtration and/or sampling. In some embodiments, the first collection passage 14a may collect permeate from filtration units 13 of the first filter set 12a, e.g., on the first side 16a of the body 15 of the manifold 11, but may be fluidly isolated from filtration units 13 of the second filter set 12b, e.g., on the second side 16b of the body 15 of the bidirectional manifold 11. The second permeate collection passage 14*b* may collect permeate from filtration units 13 of second filter set 12*b*, e.g., on the second side 16 of the body 15 of the bidirectional manifold 11, but may be fluidly isolated from the filtration units 13 of the first filter set 12*a*, e.g., on the first side 16*a* of the manifold 11.

Figure 2:
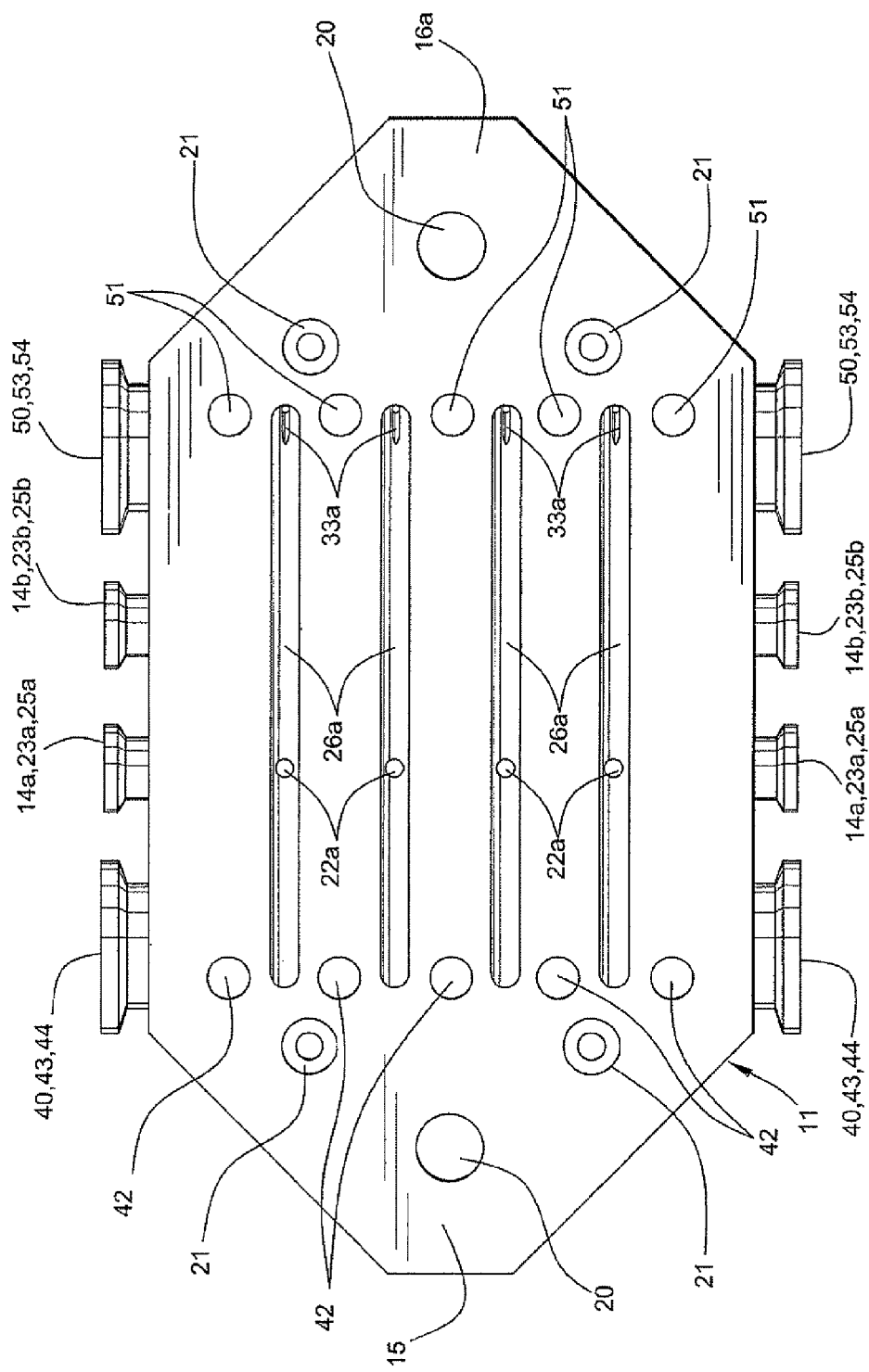
FIG. 2 is a front view of a filtration manifold.

Each permeate collection passage may be configured in any of numerous ways, including as a network of passageways. For example, a first permeate collection passage may include at least one first permeate inlet, at least one first permeate bore, at least one first permeate channel, and at least one first permeate outlet, all of which may be arranged in any of a variety of different ways. For example, as shown in FIGS. 2-4, the first permeate inlet 22*a* may fluidly communicate with a first permeate bore 23*a* via a first permeate channel 24*a*. The first permeate bore 23*a* may, in turn, fluidly communicate with a first permeate outlet 25*a*, for example, at the top and/or bottom of the manifold 11. The first permeate inlet 22*a* may be located anywhere on the manifold. In many embodiments the first permeate inlet 22*a* may be positioned on a first side 16*a* of the manifold 11 and no first permeate inlet may be positioned on the second side 16*b*.

The second permeate collection passage may be configured in a variety of different ways. For example, the second permeate collection passage may be configured like the first permeate collection passage. The second permeate collection passage may include at least one second permeate inlet, at least one second permeate bore, at least one second permeate channel, and at least one second permeate outlet, all of which may be configured in a variety of different ways. For example, the second permeate inlet 22*b* may fluidly communicate with a second permeate bore 23*b* via a second permeate channel 24*b*. The second permeate bore 23*b* may, in turn, fluidly communicate with a second permeate outlet 25*b*, for example, at the top and/or bottom of the manifold 11. The second permeate inlet 22*b* may be located anywhere on the manifold. In many embodiments the second permeate inlet 22*b* may be positioned on a second side 16*b* of the bidirectional manifold 11 and no second permeate inlet may be positioned on the first side 16*a*.

In many embodiments, either or both of the first and second permeate collection passages may further include at least one permeate conduit. The permeate conduit may fluidly communicate with the permeate inlet, and may be positioned on the exterior or the interior of either or both sides of the manifold. The permeate conduit may be configured in a variety of different ways, including as a groove or a channel. For example, as shown in FIGS. 2 and 4, one or more first permeate conduits 26*a* may be in the form of grooves on the first side 16*a* of the manifold 11 fluidly communicating with the first permeate inlets 22*a*. Similarly, one or more second permeate conduits 26*b* may be in the form of grooves on the second side 16*b* of the manifold 11 fluidly communicating with the second permeate inlets 22*b*. The permeate conduits 26*a*, 26*b* may facilitate the flow of the fluid to the permeate inlets 22*a*, 22*b*.

Each permeate collection passage may include any number and configuration of permeate inlets, permeate outlets, permeate bores, permeate channels, and/or permeate conduits. In some embodiments, as shown in FIGS. 2-4, the first permeate collection passage may include multiple first permeate channels 24*a*, for example, between 2 and 20 channels, and multiple first permeate inlets 22*a*, for example, between 2 and 20 inlets. In some embodiments, all of the first permeate inlets 22*a* may be in the first side 16*a* of the manifold 11 and none of the first permeate inlets may be in the second side 16*b*. Each first permeate channel 24*a* may connect a single first permeate bore 23*a* to a different first permeate inlet 22*a* on the first side 16*a* of the manifold 11. Likewise, the second permeate collection passage, which is isolated from the first permeate collection passage, may include multiple second permeate channels 24*b*, for example, between 2 and 20 channels, and multiple second permeate inlets 22*b*, for example, between 2 and 20 inlets. Each of the second permeate inlets 22*b* may be in the second side 16*b* of the bidirectional manifold 11 and none of the second permeate inlets may be in the first side 16*a*. Each second permeate channel 24*b* may connect a single second permeate bore 23*b* to a different second permeate inlet 22*b* on the second side 16*b* of the manifold 11. In the isolated first and second permeate passages, the first permeate inlets 22*a*, first permeate bore 23*a*, first permeate conduit 26*a*, first permeate channels 24*a*, and first permeate outlet 25*a* do not fluidly communicate with the second permeate inlets 22*b*, second permeate bore 23*b*, second permeate conduit 26*b*, second permeate channels 24*b*, and second permeate outlet 25*b*.

In some embodiments, the first and second permeate collection passages may be identical and may include the same number and/or configuration of passageways. In other embodiments, one permeate collection passage may differ from the other permeate collection passage. For example, one permeate collection passage may include more passageways than the other permeate collection passage. However, the first and second permeate collection passages may still be isolated from one another.

The permeate collection passages, including the permeate inlets, permeate outlets, permeate bores, permeate conduits and permeate channels may have any suitable shape, size, and orientation. For example, a permeate bore may have a larger width or diameter than the permeate channels because it may collect permeate from multiple permeate channels. The permeate inlets and permeate outlets may be, for example, circular or elliptical in shape, and may be positioned at any suitable locations on the manifold. The permeate channels may be configured in any suitable manner that fluidly communicates between the permeate inlets and the permeate bores.

The manifold may further include first and second permeate sampling ports. For example, as shown in FIGS. 2-4, the manifold 11 may include a first sampling port 30*a* and a second sampling port 30*b*. The first sampling port 30*a* may be in fluid communication with the first permeate collection passage 14*a* and isolated from the second permeate collection passage 14*b*. The second sampling port 30*b* may be in fluid communication with the second permeate collection passage 14*b* and isolated from the first permeate collection passage 14*a*. The first sampling port 30*a* may thus fluidly communicate only with the permeate that passes through the filtration media of the filtration units 13 of the first set 12*a*. In the embodiment of FIG. 1, the first sampling port 30*a* then fluidly communicates only with the permeate from the filtration units 13 on the first side 16*a* of the manifold 11. The second sampling port 30*b* may fluidly communicate only with the permeate that passes through the filtration media of the filtration units 13 of the second set 12*b*. In the embodiment of FIG. 1, the second sampling port 30*b* then fluidly communicates only with the permeate from the filtration units 13 on the second side 16*b* of the bidirectional manifold 11.

The sampling ports may each include one or more sampling passages and may be configured in any suitable way. For example, the first sampling port may include a first sampling passage 31*a* that is in fluid communication with any portion of the first permeate collection passage, e.g., in fluid communication with the first permeate inlet, the first permeate bore, the first permeate conduit, the first permeate outlet, and/or the first permeate channels. Likewise, the second sampling port may include a second sampling passage 31b that is in fluid communication with any portion of the second permeate collection passage, e.g., in fluid communication with the second permeate inlet, the second permeate bore, the second permeate conduit, the second permeate outlet, and/or the second permeate channels.

Each sampling passage may be configured in any of a variety of different ways. For example, each sampling passage may include any or all of sampling inlet(s), sampling channel(s), and sampling bore(s), any or all of which may fluidly communicate with a permeate passage. For example, as shown in FIGS. 2-4, the first sampling port 30a may be in fluid communication with the first sampling passage 31a, which may include a first sampling bore 32a. The first sampling bore 32a may fluidly communicate with one or more first permeate sampling inlets 33a via first permeate sampling channels 34a. The first permeate sampling inlets 33a may be positioned, e.g., on the first side 16a of body 15 of manifold 11. Likewise, a second sampling port 30b may be in fluid communication with a second permeate sampling passage 31b which may include a second permeate sampling bore 32b. The second permeate sampling bore 32b may fluidly communicate with one or more second sampling inlets 33b via a second sampling channels 34b. The second sampling inlets 33b may be positioned, e.g., on the second side 16b of the body 15 of a bidirectional manifold 11. The sampling inlets 33a, 33b of either or both of the first and second sampling passages may also fluidly communicate with a permeate conduit 26a, 26b. The permeate conduits 26a, 26b may facilitate the flow of permeate to the sampling inlets 33a, 33b. The number, shape and size of any component of the sampling passages may be varied to accommodate any sampling devices, technique or volume.

The manifold may have only permeate passages and may, for example, be used in dead-end flow filtration assemblies or tangential flow filtration assemblies. Alternatively, the manifold may include one or more additional passages. For example, the manifold may include at least one feed passage for receiving feed fluid from a source and distributing feed fluid to the filtration units. Manifolds having a feed passage may also be used in dead-end flow filtration assemblies or tangential flow filtration assemblies. The feed passage may be configured in a variety of different ways. For example, the feed passage may comprise a network that may include at least one feed inlet, at least one feed bore, at least one feed channel, and at least one feed outlet. A feed inlet may be positioned, for example, at the top, bottom, and/or one or both ends of the body of the manifold. A feed outlet may be positioned on only one side and feed fluid may flow unidirectionally from the manifold, or a feed outlet may be positioned on each of at least two sides, e.g., opposite sides, and the feed fluid may flow bidirectionally from the manifold. The feed passage 40 may include one or more feed channels 41, for example, between 1 and 20 feed channels. Each side 16a, 16b of the body 15 of a bidirectional manifold 11 may include one or more feed outlets 42, for example, between 1 and 20 feed outlets. Each feed channel 41 may connect a feed bore 43 to a different feed outlet 42. As shown in FIG. 4, for example, the feed passage 40 may include a feed inlet 44 at the top and bottom of the manifold 11 fluidly communicating with the feed channels 41 via the feed bore 43. The feed channels 41, in turn, may fluidly communicate with feed outlets 42 positioned on the first side 16a and/or the second side 16b of the body 15 of the manifold 11.

Additionally or alternatively, the manifold may include at least one retentate passage for receiving retentate fluid from the filtration units and directing the retentate from the manifold. Manifolds having a retentate passage may be used in tangential flow filtration assemblies. The retentate passage may be configured in a variety of different ways. For example, the retentate passage 50 may comprise a network that may include at least one retentate inlet, at least one retentate bore, at least one retentate channel, and at least one retentate outlet. A retentate inlet may be positioned on only one side and retentate may flow unidirectionally into the manifold, or a retentate inlet may be positioned on each of at least two sides, e.g., opposite sides, and the retentate may flow bidirectionally into the manifold. Each side 16a, 16b of the body 15 of a bidirectional manifold 11 may include one or more retentate inlets 51, for example, between 1 and 20 retentate inlets. The retentate passage 50 may further include one or more retentate channels 52, for example, between 1 and 20 retentate channels. Retentate inlets 51 on the first side 16a and/or the second side 16b of the body 15 of the manifold 11 may fluidly communicate with a retentate bore 53 via the retentate channels 52. For example, each retentate channel 52 may connect the retentate bore 53 to a different retentate inlet 51. The retentate bore 53 may, in turn, fluidly communicate with a retentate outlet 54, for example, at the top and bottom of the manifold 11.

In the illustrated embodiment, the tangential flow filtration manifold 11 may include permeate, feed, and retentate passages. Although the manifold has been described above in terms of tangential flow filtration applications, manifolds according to the invention may also be suitable for direct flow and deadend flow applications. Such manifolds may have passages that are similar to those of a tangential flow filtration manifold, but they may lack retentate passages. In other embodiments, the manifold may not include a feed passage and/or a retentate passage. The feed and/or retentate may then be supplied to and/or collected from the filtration units in other ways, for example, by additional manifolds.

The filtration assembly may further comprise a plurality of filter sets, e.g., at least two filter sets, which may be configured in any of a variety of different ways. For example, as shown in FIG. 1, each filter set 12a, 12b may include at least one filtration unit 13, although each filter set 12a, 12b may include any number of filtration units 13. For example, the filter sets 12a, 12b shown in FIG. 1 each include four filtration units 13. The first and second filter sets 12a, 12b may include the same number of filtration units 13, as shown in FIG. 1, or one filter set may include more filtration units than the other filter set. The filtration units 13 of the first and second filter sets 12a, 12b may be configured identically or differently.

The filter sets may be arranged within a filter assembly in any of a variety of different ways. For example, as shown in FIG. 1, all of the filtration units 13 in the first filter set 12a may be on the first side 16a of the body 15 of the manifold 11 and all of the filtration units 13 in the second filter set 12b may be on the second side 16b of the body 15 of the manifold 1. In other embodiments, the first filter set may include filtration units on both the first and second sides of the body of the manifold and the second filter set may include filtration units on both the first and second sides of the body of the manifold. In still other embodiments, the filtration units of the first set may all be on one side of the body while the filtration units of the second set may be on both sides of the body of the manifold. Alternatively, the filtration units of both the first and second filter sets may be on the same side of the manifold.

A filtration unit may have any size and shape and may be configured in a variety of different ways. For example, a filtration unit may include a filtration medium cooperatively arranged with a casing. The casing may include any suitable housing for the filtration medium, e.g., a frame. The filtration unit may be part of a plate and frame device in which separate filtration medium sheets and frames are compressed and sealed between one another. Alternatively, the filtration unit may comprise a filtration cassette in which a filtration medium is integrally fitted with and sealed to a casing.

As shown in FIG. 1, each filtration unit 13 may include a filtration medium 60 arranged with a casing 61 to define a feed side 62a and a permeate side 62b of the filtration medium 60. The filter medium may be porous or permeable and may have any suitable treatment characteristic. For example, the filtration medium may have, or may be modified to have, any of several characteristics. The filtration medium may have a positive, negative, or neutral electrical charge; it may be liquiphobic or liquiphilic, including, for example, hydrophobic or hydrophilic, or oleophobic or oleophilic; it may include attached functional groups, such as ligands, that can chemically bind to substances in the fluid. The filtration medium may be formed from, impregnated with, or otherwise contain a variety of materials, such as sorbents, ion exchange resins, enzymes, or catalysts, that may chemically or physically bind, react with, or otherwise alter substances in the fluid. Further, the filtration medium may have any of a wide range of molecular cutoffs or removal ratings, including, for example, from ultraporous or nanoporous or finer to microporous or coarser. The filtration medium may thus function as a treatment medium of any type, including a capture medium, a separation medium, or a filter medium.

A filtration unit may also include at least one feed passage fluidly communicating with the feed side of the filtration medium and at least one permeate passage fluidly communicating with the permeate side of the medium. For some embodiments, the filtration unit may further include at least one retentate passage fluidly communicating with the feed side of the filtration medium. For example, as shown in FIG. 1, each filtration unit 16 may include a feed passage 63 which may pass completely through one end of the casing 61 and branch across and fluidly communicate with the feed side 62a of the filtration medium 60. Each filtration unit 13 may further include a retentate passage 64 which may pass completely through the other end of the casing 61 and branch across and fluidly communicate with the feed side 62a of the filtration medium 60 and the feed passage 63. Each filtration unit 13 of the first and second filter sets 12a, 12b may include a permeate passage 65a, 65b which may pass completely through one or both ends of the casing 61 and branch across and fluidly communicate with the permeate side 62b of the filtration medium 13 from one or both ends of the casing 61.

The manifold and the multiple sets of filtration units may be assembled within the filtration assembly in any of numerous ways. For example, the filtration assembly may further include at least one end piece, at least one compression rod, and at least one alignment rod to assemble the manifold and the sets of filtration units within the filtration assembly with their feed passages, retentate passages, and permeate passages in respective fluid communication. In particular, the manifold and the sets of filtration units may be assembled within the filtration assembly such that (1) a first permeate collection passage of the manifold fluidly communicates with the permeate passages of the first filter set that conduct permeate from the permeate side of the filtration media of the filtration units of a first filter set but is isolated from the permeate passages of the second filter set that conduct permeate from the permeate side of the filtration media of the filtration units of a second filter set and (2) a second permeate collection passage of the manifold fluidly communicates with the permeate passages of the second filter set that conduct permeate from the permeate side of the filtration media of the filtration units of the second filter set but is isolated from the permeate passages that conduct permeate from the permeate side of the filtration media of the first filter set.

In the embodiment of FIG. 1, the manifold 11 and the filtration units 13 may be aligned and compressed against one another between opposite end pieces 66a, 66b by a plurality of compression rods 70 and/or a plurality of alignment rods 71. The end pieces may be variously configured, for example, as end plates 66a, 66b. Alternatively, the end pieces may comprise one or more manifolds. The compression rods 70 and the alignment rods 71 may have any of numerous configurations. For example, the compression rods may, or may not, be configured as disclosed in U.S. Provisional Patent Application No. 60/873,980 entitled Filtration Assemblies and Methods of Maintaining Compression of Filtration Units in Filtration Assemblies, which listed Roger Gagnon, Franco Morizio, and Robert Ieraci as an inventor and which was filed on Dec. 11, 2006. The alignment rods may, or may not, be configured as disclosed in U.S. Provisional Patent Application No. 60/873,944 entitled Filtration Assemblies and Methods of Installing Filtration Units in Filtration Assemblies, which listed Robert Gagnon, Thomas Scholz, Sylvia Messier, and Martin Weinstein as an inventor and which was filed on Dec. 11, 2006. Some embodiments may include both one or more compression rods and one or more alignment rods. Other embodiments may include compression rods and no alignment rods, and the compression rods may additionally serve to align the filtration units and the manifold. Still other embodiments may include alignment rods and no compression rods, and the alignment rods may additionally serve to establish and/or maintain compression of the filtration assembly.

The alignment rods and compression rods may be positioned in the assembly in a variety of different ways. For example, at least one alignment rod may extend from or through at least one end piece to or through the body of the manifold. The alignment rods may align the filtration units with the manifold. For example, as shown in FIG. 1, first and second alignment rods 71 may extend from first and second end pieces 66a, 66b, respectively, into sockets 21 on the body 15 of the manifold 11. The alignment rods 71 may align the manifold 11 and the filtration units 13 with their feed passages, retentate passages and permeate passages, respectively, in fluid communication with one another. At least one compression rod may extend from or through at least one end piece to or through the body of the manifold. The compression rods may compress the filtration units between the manifold and end piece(s), sealing them to one another. For example, as shown in FIG. 1, first and second compression rods 70 may extend through the first and second end plates 66a, 66b through holes 20 in the body 15 of the manifold 11. The compression rods 70 may compress the filtration units 13 and the manifold 11 between the first and second end plates 66a, 66b to seal them against one another with the respective passages in fluid communication. The end plates 66a, 66b may be arranged to seal any fluid passages in the adjacent filtration units 13.

In the embodiment of FIG. 1, the first filter set 12a of filtration units 13 may be mounted to a first side 16a of the manifold 11, while the second filter set 12b of filtration units 13 may be mounted to the opposite second side 16b of the manifold 11. The feed passages 63 and the retentate passages 64 of the filtration units 13 of the first set 12a may respectively fluidly communicate with the feed outlets 42 and the retentate inlets 51 on the first side 16a of the manifold 11. The feed passages 63 and the retentate passages 64 of the filtration units 13 of the second set 12b may respectively fluidly communicate with the feed outlets 42 and the retentate inlets 51 on the second side 16b of the manifold 11. Further, the permeate passages 65a of the filtration units 13 of the first set 12a may fluidly communicate only with the permeate inlets 22a on the first side 16a of the manifold 11 and the remainder of the first permeate collection passage 14a and may be isolated from the permeate inlets 22b on the second side 16b of the manifold 11 and the remainder of the second permeate collection passage 14b in the manifold 11. The permeate passages 65b of the filtration units 13 of the second set 12b may fluidly communicate only with the permeate inlets 22b on the second side 16b of the manifold 11 and the remainder of the second permeate collection passage 14a and may be isolated form the permeate inlets 22a on the first side 16a of the manifold 11 and the remainder of the first permeate collection passage 14a in the manifold 11.

Figure 5:
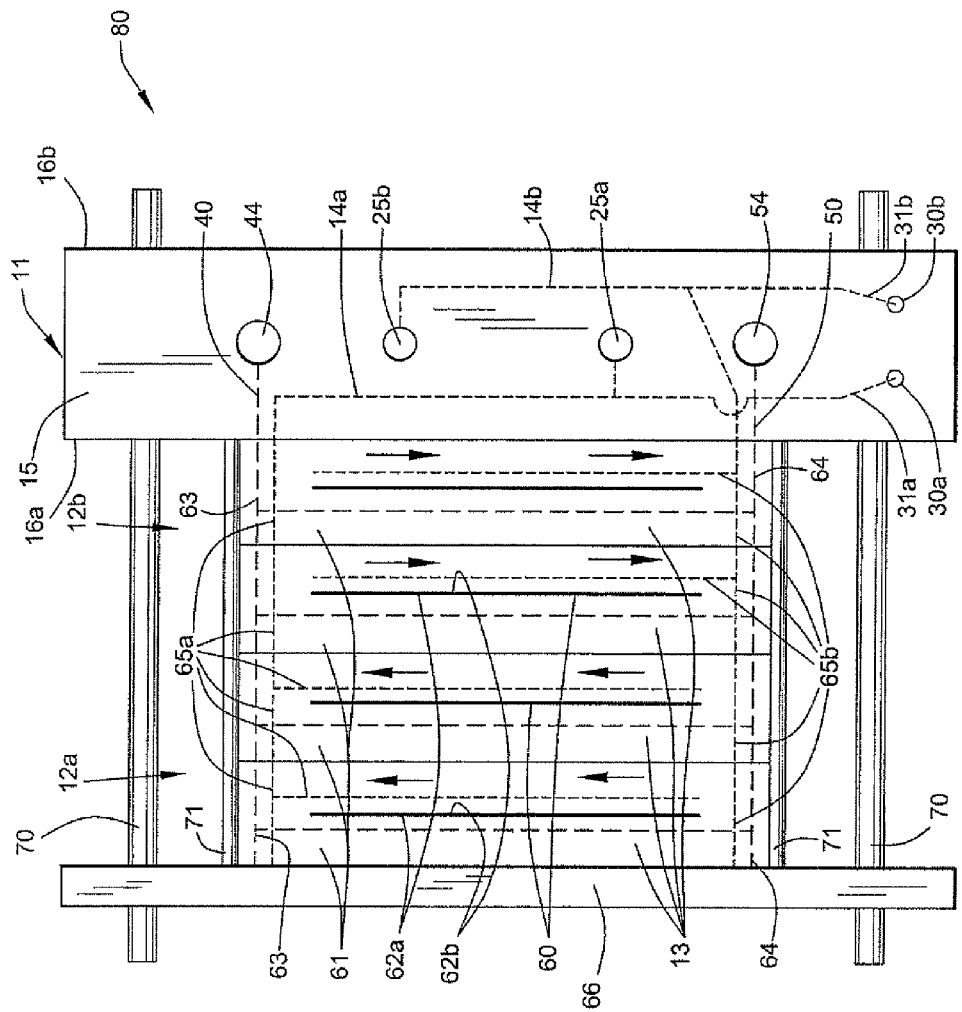
FIG. 5 is a representative view of a second embodiment of a filtration assembly.

An alternative embodiment of a filtration assembly of the present invention is shown in FIG. 5. The second embodiment of the filtration assembly may be configured as a tangential flow filtration assembly, as shown in FIG. 5, or may be configured as a dead-end flow filtration assembly. Like the first embodiment of the filtration assembly 10, the second embodiment of the filtration assembly 80 may include a manifold 11 and first and second filter sets 12a, 12b. The manifold 11 of the second assembly 80 may be configured like the manifold 11 of the first assembly 10 and corresponding features are identified by the same reference numerals. However, the manifold 11 of the second assembly 80 may be unidirectional. For example, the first and second isolated permeate collection passages 14a, 14b of the manifold 11 of the second filtration assembly 80 may both communicate with only a single side 16a of the manifold 11.

Further, both the first and the second filter sets 12a, 12b of the second filtration assembly 80 may be positioned on the same side 16a of the manifold 11, e.g., between the manifold 11 and a single end piece 66. The manifold 11 then additionally functions as the second end piece. The second filtration assembly 80 may also include compression rods 70 and alignment rods 71 extending between the end piece 66 and the manifold 11.

The first and second filter sets 12a, 12b of the second filtration assembly 80 may each include at least one filtration unit 13. The filtration units 13 of the second filtration assembly 80 may be similar to the filtration units 13 of the first filtration assembly 10 and corresponding features are identified by the same reference numerals. For example, each filtration unit 13 of the second filtration assembly 80 may comprise a filtration cassette include a casing 61 and a filtration medium 60 integrally fitted and sealed to the casing 61 to define a feed side 62a and a permeate side 62b of the medium 60. A feed passage 63 may extend completely through one end of the filtration cassette 13 and branch across and fluidly communicate with the feed side 62a of the filtration medium 60. In filtration assemblies arranged for tangential flow filtration, a retentate passage 64 may extend completely through the other end of the filtration cassette 13 and branch across and fluidly communicate with the feed side 62a of the filtration medium 60 and the feed passage 63. Filtration assemblies arranged for direct flow or dead-end flow filtration may not have any retentate passages.

The permeate passages of the filtration cassettes 13 of the second filtration assembly 80 may differ from the permeate passages of the filtration cassettes 13 of the first filtration assembly 10. For example, each filtration cassette of the second filtration assembly 80 may include first and second permeate passages that are fluidly isolated from one another.

In the embodiment of FIG. 5, each filtration cassette 13 of the first set 12a may have one permeate passage 65a which may pass completely through one end of the filtration cassette 13 and branch across and fluidly communicate with the permeate side 62b of the filtration medium 60. Each filtration cassette 13 of the first set 12a may also have another permeate passage 65b which may pass completely through the other end of the filtration cassette 13 and may be fluidly isolated from the permeate side 62b of the filtration medium 60 and the permeate passage 65a that communicates with the permeate side 62b. Each filtration cassette 13 of the second set 12b may have one permeate passage 65b which may pass completely through one end of the filtration cassette 13 and branch across and fluidly communicate with the permeate side 62b of the filtration medium 60. Each filtration cassette 13 of the second set 12b may also have another permeate passage 65a which may pass completely through the other end of the filtration cassette 13 and may be fluidly isolated from the permeate side 62b of the filtration medium 13 and the permeate passage 65b that communications with the permeate side 62b.

In the embodiment of FIG. 5, the compression rods 70 and the alignment rods 71 compress and align the first and second filter sets 12a, 12b of the filtration units 13 between the manifold 11 and the end piece 66, both the first filter set 12a and the second filter set 12b being disposed along the same side 16a of the manifold 11. The filtration units 13 of the first filter set 12a may be grouped together and the filtration units 13 of the second filter set 12b may be grouped together, as shown in FIG. 5, or the filtration units of the first and second filter sets may be intermingled. The feed passages 63 and the retentate passages 64 of the filtration units 13 of the first and second filter sets 12a, 12b may respectively fluidly communicate with the feed passage 40 and the retentate passage 50 of the manifold 11. Further, the permeate passages 65a that communicate with the permeate side 62b of the filtration units 13 of the first set 12a may fluidly communicate only with the first permeate collection passage 14a of the manifold 11 and may be fluidly isolated from the second permeate collection passage 14b of the manifold 11. The permeate passages 65a that communicate with the permeate side 62b of the filtration units 13 of the first set 12a include the permeate passages 65a in the filtration units 13 of the second set 12b that are fluidly isolated from the permeate side 62b of the filtration units 13 of the second set 12b. Similarly, the permeate passages 65b that communicate with the permeate side 62b of the filtration units 13 of the second set 12b may fluidly communicate only with the second permeate collection passage 14b of the manifold 11 and may be fluidly isolated from the first permeate collection passage 14a of the manifold 11. The permeate passages 65b that communicate with the permeate side 62b of the filtration units 13 of the second set 12b include the permeate passages 65b in the filtration units 13 of the first set 12a that are fluidly isolated from the permeate side 62b of the filtration units 13 of the first set 12a.

In accordance with other embodiments of the invention, multiple filtration assemblies may be coupled in any of numerous ways, e.g., stacked either on top of one another, side by side, or end to end, and connected in series and/or parallel arrangements. For example, filtration manifolds from two adjacent filtration assemblies may be aligned such that they are in fluid communication with one another.

The filtration assemblies, manifolds, and filtration units may be used to filter fluids in any of a variety of different ways. Filtering fluids may include directing a feed fluid to a filtration unit of the filtration assembly in any of a variety of different ways. For example, filtering a fluid may include supplying the feed fluid to a feed passage 40 of a manifold 11 via a feed inlet 44 from a source. The feed fluid may pass through the feed inlet 44 into the feed bore 43 and then pass into one or more feed channels 41 to one or more feed outlets 44 of the manifold 11. From the feed outlet 44, the feed fluid may exit the manifold 11 bidirectionally or unidirectionally and enter the feed passages 63 of filtration units 13 of both filter sets 12a, 12b. In the embodiment of FIG. 1, the feed fluid may exit bidirectionally from both sides 16a, 16b of the manifold 11 and enter one filter set 12a on one side 16a and the other filter set 12b on the other side 16b. In the embodiment of FIG. 5, the feed fluid may exit unidirectionally from one side 16a of the manifold 11 and enter both filter sets 12a, 12b on that side.

The feed fluid may pass from the manifold through the filtration units in a variety of different ways. For example, the feed fluid may pass from the feed outlet 44 of the manifold 11 through the feed passages 63, e.g., on one end of the filtration units 13, of both filter sets 12a, 12b, where it may contact the feed side 62a of filtration media 60. The feed fluid may pass tangentially along the feed side 62a of each filtration media 60, where a portion of the feed fluid, i.e., the permeate, passes through the filtration medium 60 from the feed side 62a to the permeate side 62b. The remainder of the feed fluid, i.e., the retentate, may pass along from the feed side 62a of the filtration media 60 to the retentate passages 64, e.g., on the other end of the filtration units 13, of both filter sets 12a, 12b, along which the retentate passes to the retentate inlets 51 of the manifold 11.

The retentate may pass through the manifold in any of a variety of different ways. For example, the retentate may pass from the retentate passages 64 of the filter sets 12a, 12b into one or more retentate inlets 51. In the embodiment of FIG. 1, the retentate may exit the retentate passages 64 of the filter sets 12a, 12b and bidirectionally enter the retentate inlets 51 on both sides 16a, 16b of the manifold 11. In the embodiment of FIG. 5, the retentate may exit the retentate passages 64 of the filter sets 12a, 12b and unidirectionally enter the retentate inlet 51 on only one side 16a of the manifold 11. From the retentate inlet 51, the retentate may further pass through one or more retentate channels 52 into the retentate bore 53 and exit the retentate bore 53 and the manifold 11 through the retentate outlet 54. Alternatively, the retentate may be passed from the retentate passages of the filter sets into a separate retentate manifold and may exit the assembly from the separate retentate manifold. Additionally, the retentate may be recirculated to the feed passages of the manifold and filter sets.

Filtering the fluid may also include passing the permeate through the filtration medium 60, where the fluid may be treated in any of numerous ways. From the permeate side of the filtration media, the permeate from the filtration units may be directed to the manifold in any manner in which the permeate from the first filter set remains isolated from the permeate from the second filter set. For example, the permeate from all of the filtration units on one side of the manifold may be directed to permeate inlets on that side of the manifold, while the permeate from all of the filtration units on the other side of the manifold may be directed to permeate inlets on the other side of the manifold. The permeate from the filtration units on one side of the manifold may then be commingled en route to the manifold, and the permeate from the filtration units on the other side of the manifold may be commingled en route to the manifold.

In the embodiment of FIG. 1, the permeate may pass bidirectionally into the manifold 11. For example, the permeate from each filtration unit 13 of the first set 12a, which is on the first side 16a of the manifold 11, may pass to the first permeate collection passage 14a on the first side 16a of the manifold 11. From the permeate side 62b of each filtration unit 13 of the first set 12a, the permeate may pass to either end of the filtration unit 13 and along the permeate passages 65a in the opposite ends of the filtration units 13 to the first permeate collection passage 14a in the first side 16a of the manifold 11. Alternatively, the permeate may pass to only one end of each filtration unit and along a permeate passage to the manifold. The permeate from all of the filtration units 13 on the first side 16a of the manifold 11 may be commingled.

Similarly, the permeate from each filtration unit 13 of the second set 12b, which is on the second side 16b of the manifold 11, may pass to the second permeate collection passage 14b on the second side 16b of the manifold 11. From the permeate side 62b of each filtration unit 13 of the second set 12b, the permeate may pass to either end, or only one end, of the filtration unit 13 and along the permeate passages 65b in the opposite ends of the filtration units 13 to the second permeate collection passage 14b in the second side 16b of the manifold 11. The permeate from all of the filtration units 13 on the second side 16b of the manifold 11 may be commingled.

As an alternative example, the permeate from one set of filtration units on one side of the manifold may be directed to permeate inlets on that side of the manifold, while the permeate from another set of filtration units on the same side of the manifold may be directed to other permeate inlets on that side of the manifold. The permeate from the filtration units of the first set may be commingled en route to the manifold, and the permeate from the filtration units of the second set may be commingled en route to the manifold. However, the permeate from the filtration units of the first set and the permeate from the filtration units of the second set may be fluidly isolated from one another en route to the manifold.

In the embodiment of FIG. 5, the permeate may pass unidirectionally into the manifold. The permeate from each filtration unit 13 of the first set 12a, which is on the first side 16a of the manifold 11, may pass to the first permeate collection passage 14a on the first side 16a of the manifold 11. In particular, from the permeate sides 62b of the filtration units 13 of the first set 12a, the permeate may pass to a first end of the filtration units 13 and along permeate passages 65a through that end of the filtration units 13 to the first permeate collection passage 14a in the first side 16a of the manifold 11. The permeate from all of the filtration units 13 of the first set 12a may be commingled en route to the manifold 11. The permeate from each filtration unit 13 of the second set 12b, which is also on the first side 16a of the manifold 11, may pass to the second permeate collection passage 14b on the first side 16a of the manifold 11. In particular, from the permeate sides 62b of the filtration units 13 of the second set 12b, the permeate may pass to opposite second ends of the filtration units 13 and along the permeate passages 65b through that end of the filtration units 13 to the second permeate collection passage 14b in the first side 16a of the manifold 11. The permeate from all of the filtration units 13 of the second set 12b may be commingled en route to the manifold 11. However, the permeate from the filtration units 13 of the first set 12a may be fluidly isolated form the permeate from the filtration units 13 of the second set 12b in the filtration units 13 en route to the manifold 11 because the permeate flows through permeate passages 65a in the first ends of the filtration units 13 of the second set 12b which may be fluidly isolated from the permeate side 62b of the filtration units 13 of the second set 12b. Similarly, the permeate from the filtration units 13 of the second set 12b may be fluidly isolated from the permeate from the filtration units 13 of the first set 12a in the filtration units 13 en route to the manifold 11 because permeate flows through the permeate passages 65b in the second ends of the filtration units 13 of the first set 12a which may be fluidly isolated from the permeate side 62b of the filtration units 13 of the first set 12a.

Once inside the manifold, the permeate may pass through the manifold in any of a variety of ways. For example, the permeate from a first set of filtration units may pass within the manifold along the first permeate collection passage 14a, e.g., from one or more first permeate inlets along a first permeate collection passage to a first permeate outlet in the manifold. Similarly, the permeate from a second set of filtration units may pass within the manifold along the second permeate collection passage 14b, e.g., from one or more second permeate inlets along a second permeate collection passage to a second permeate outlet in the manifold. Within the manifold, the permeate from the first set of filtration units and the permeate from the second set of filtration units may remain fluidly isolated from one another.

For example, the permeate from a first set 12a of filtration units 13 may enter one or more first permeate inlets 22a and the permeate from a second set 12b of filtration units 13 may enter one or more second permeate inlets 22b. In the embodiment of FIG. 1, the first permeate and the second permeate may enter the manifold 11 bidirectionally on different sides, e.g., first and second opposite sides 16a, 16b, of the manifold 11. In the embodiment of FIG. 5, the first permeate and the second permeate may enter the manifold 11 unidirectionally on the same side, e.g., the first side 16a, of the manifold 11. From the first and second permeate inlets 22a, 22b, the first permeate and the second permeate may respectively flow through one or more first and second permeate channels 24a, 24b into first and second permeate bores 23a, 23b and then exit the first and second permeate bores 23a, 23b and the manifold 11 via first and second permeate outlets 25a, 25b. The first permeate and the second permeate may remain fluidly isolated from one another within the manifold 11 because the first permeate and the second permeate flow through first and second permeate collection passages 14a, 14b that may be fluidly isolated from one another with the manifold 11.

For many embodiments, the first permeate and the second permeate in the manifold may be separately sampled in any of numerous ways. For example, portions of permeate produced in each of first and second filter sets 12a, 12b may respectively pass into first and second sampling bores 32a, 32b via first and second sampling passages 31a, 31b, which may, in turn, be in fluid communication with the first and second permeate collection passages 14a, 14b of the manifold 11, respectively. Samples of the first permeate and the second permeate may be obtained, for example, from the first and second sampling ports 30a, 30b. Samples of the first permeate may be fluidly isolated from samples of the second permeate in their respective sampling flow paths. Samples may be easily drawn at regular intervals and tested for any of a variety of different characteristics, including removal efficiency and contamination. Samples may be any suitable volume necessary for any test. Since the first permeate collection passages and the first sampling flow paths may be isolated from the second permeate collection passages and the second sampling flow paths, any contamination or poor removal efficiency detected in the sample drawn from a sample port may pinpoint which filter set includes a filtration unit that requires repair, cleaning, or other maintenance. Since only one filter set may then be examined for a faulty filtration unit, the assemblies, manifolds, filtration units, and methods of the invention greatly reduce the maintenance time and provide for a more efficient filtration process.

While various aspects of the invention have been illustrated and described with reference to several embodiments, variations of these embodiments as well as completely different embodiments may be encompassed by the invention. For example, one or more of the features of any of the disclosed embodiments may be substituted and/or combined with one or more features of any other embodiment. Additionally, an embodiment may include fewer than all of the features of each disclosed embodiment. Accordingly, the invention includes all modifications encompassed within the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filtration manifold, comprising:
    a body having an interior, an exterior, and first and second opposite sides on the exterior of the body;
    a first permeate collection passage in the interior of the body, the first permeate collection passage including a first permeate inlet on the first side of the body and a first permeate outlet, the first permeate inlet being located on the exterior of the body to fluidly communicate with a filtration unit that can be positioned on the exterior of the body at the first side;
    a second permeate collection passage in the interior of the body, the second permeate collection passage including a second permeate inlet on the second side of the body and a second permeate outlet, the second permeate inlet being located on the exterior of the body to fluidly communicate with a filtration unit that can be positioned on the exterior of the body at the second side, wherein the first permeate collection passage is fluidly isolated from the second side of the body, wherein the second permeate collection passage is fluidly isolated from the first side of the body, and wherein the first and second permeate collection passages are isolated from one another within the body; and a feed passage in the interior of the body, the feed passage including a feed outlet on the exterior of the body at each of the first and second sides.

2. A filtration manifold according to claim 1, wherein the first permeate collection passage further includes a first permeate network disposed in the body and including a first permeate bore coupled to the first permeate outlet and at least one first permeate channel connecting the first permeate inlet to the first permeate bore and wherein the second permeate collection passage further includes a second permeate network disposed in the body and including a second permeate bore coupled to the second permeate outlet and at least one second permeate channel connecting the second permeate inlet to the second permeate bore.

3. A filtration manifold according to claim 1, wherein the first and second permeate collection passages further include first and second ports, respectively, on the body.

4. A filtration manifold according to claim 1, wherein the first permeate collection passage includes a plurality of first permeate inlets on the first side and a corresponding plurality of first permeate channels fluidly communicating between the first permeate inlets and the first permeate outlet.

5. A filtration manifold according to claim 4 wherein the second permeate collection passage includes a plurality of second permeate inlets on the second side and a corresponding plurality of second permeate channels fluidly communicating between the second permeate inlets and the second permeate outlet.

6. A filtration manifold according to claim 1, wherein the body further includes a retentate passage in the interior of the body, the retentate passage including a retentate inlet on each side of the body.

7. A filtration manifold according to claim 1, further comprising a first sampling port fluidly communicating with the first permeate collection passage and a second sampling port fluidly communicating with the second permeate collection passage.

8. A filtration assembly, comprising:

first and second filter sets, wherein each filter set includes at least one filtration unit having a filtration medium, the filtration medium having a feed side and a permeate side; and a manifold having an interior, an exterior, first and second opposite sides on the exterior of the manifold, and first and second permeate collection passages in the interior of the manifold isolated from one another, wherein the first filter set is positioned on the exterior of the manifold at the first side and the second filter set is positioned on the exterior of the manifold at the second side, wherein the first permeate collection passage is in fluid communication with the permeate side of the filtration medium of each filtration unit of the first filter set and is fluidly isolated from the permeate side of the filtration medium of each filtration unit of the second filter set and wherein the second permeate collection passage is in fluid communication with the permeate side of the filtration medium of each filtration unit of the second filter set and is fluidly isolated from the permeate side of the filtration medium of each filtration unit of the first filter set; and wherein the manifold includes a feed passage in the interior of the manifold, the feed passage having a feed outlet on the exterior of the body at each of the first and second sides, the feed passage fluidly communicating with the feed side of the filtration medium of filtration units of the filter sets.

9. A filtration assembly according to claim 8, wherein the manifold includes a retentate passage in the interior of the manifold, the retentate passage having a retentate inlet fluidly communicating with the feed side of the filtration medium of filtration units of the filter sets.

* * * * *